(12) United States Patent
Karoubi et al.

(10) Patent No.: US 9,614,801 B2
(45) Date of Patent: Apr. 4, 2017

(54) SYSTEM AND METHOD FOR FACILITATING EMAIL MESSAGE REPLY

(71) Applicant: Yahoo! Inc., Sunnyvale, CA (US)

(72) Inventors: Stephane Karoubi, Mountain View, CA (US); Ashish Sharma, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 495 days.

(21) Appl. No.: 14/109,750

(22) Filed: Dec. 17, 2013

(65) Prior Publication Data

US 2015/0172144 A1    Jun. 18, 2015

(51) Int. Cl.
*H04L 12/58* (2006.01)
*G06Q 10/10* (2012.01)

(52) U.S. Cl.
CPC ........... *H04L 51/18* (2013.01); *G06Q 10/107* (2013.01); *H04L 51/063* (2013.01)

(58) Field of Classification Search
CPC ....................................................... G06F 3/48
See application file for complete search history.

(56) References Cited

U.S. PATENT DOCUMENTS

| 5,396,264 | A * | 3/1995 | Falcone | G06F 3/0482 340/7.55 |
| 2005/0177621 | A1 * | 8/2005 | Moody | G06Q 10/107 709/206 |
| 2005/0223063 | A1 * | 10/2005 | Chang | G06F 3/048 709/206 |
| 2006/0012677 | A1 * | 1/2006 | Neven, Sr. | G06K 9/6807 348/61 |
| 2014/0237382 | A1 * | 8/2014 | Grandhi | H04L 51/30 715/752 |
| 2015/0121311 | A1 * | 4/2015 | Lou | G06F 3/0482 715/843 |

OTHER PUBLICATIONS

Office Blogs, Microsoft, "Quicker replies in the new Outlook," <URL="https://blogs.office.com/2012/10/24/quickerrepliesinthe-newoutlook/">, Oct. 24, 2012, (last accessed Nov. 14, 2016).*

* cited by examiner

*Primary Examiner* — Linh K Pham
*Assistant Examiner* — James T Tsai
(74) *Attorney, Agent, or Firm* — Cooper Legal Group, LLC

(57) ABSTRACT

A system and method for facilitating email messaging combines the convenience of an auto-fill of the recipient fields in a standard email message with a blank canvas for composing a new, quick reply message. By selecting the quick reply feature that can be provided with the message view screen of an email utility, the user is shown a second user interface with a blank compose screen. The email recipients are automatically filled in from the message view screen of the current message. The quick reply message can be transmitted as an email message through the email utility.

21 Claims, 5 Drawing Sheets

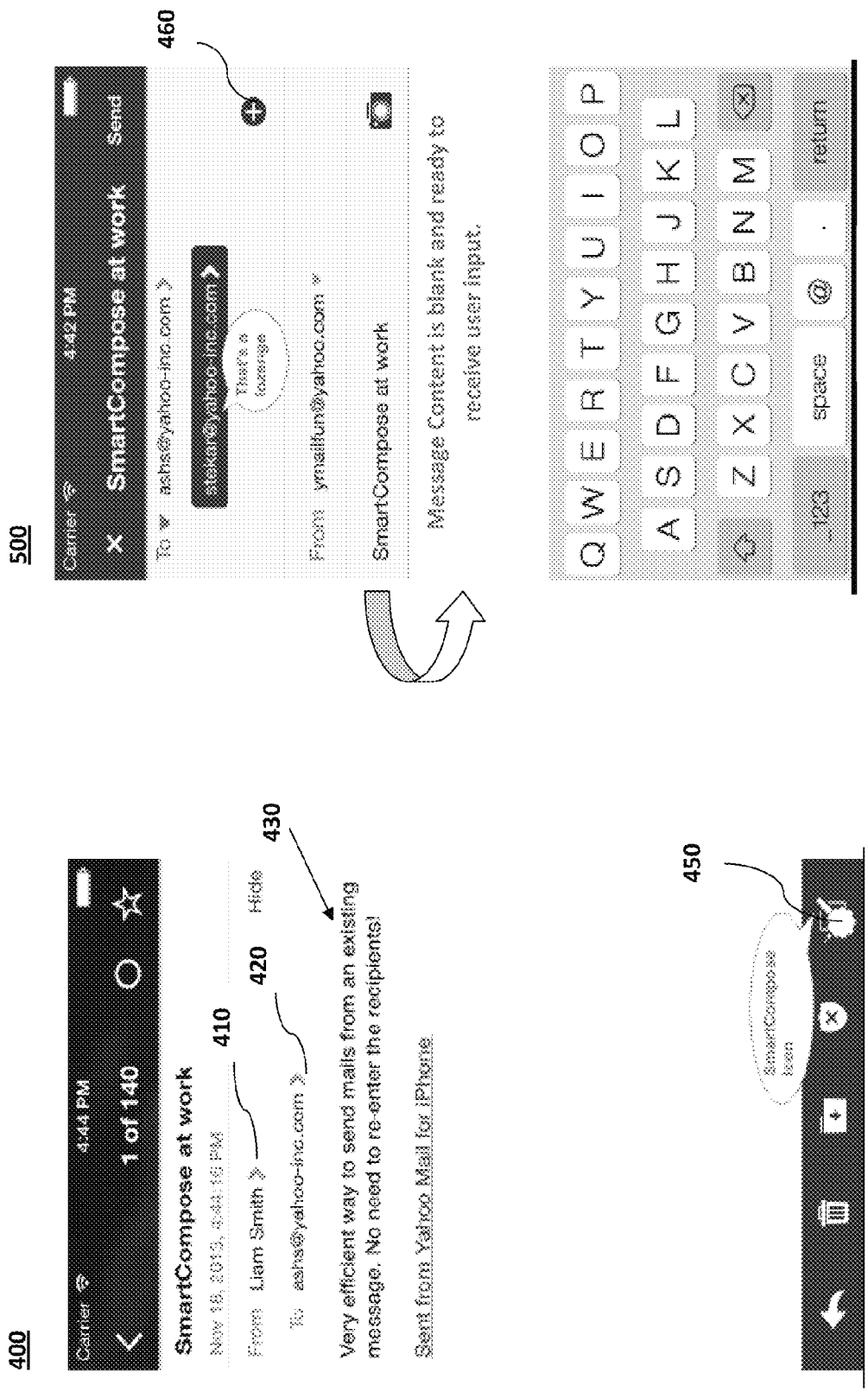

SYSTEM AND METHOD FOR FACILITATING EMAIL MESSAGE REPLY

CROSS-REFERENCE TO RELATED APPLICATIONS

None.

FIELD OF THE INVENTION

The invention disclosed broadly relates to the field of electronic messaging, and more particularly relates to the field of user interfaces to facilitate electronic messaging.

BACKGROUND OF THE INVENTION

Email messaging accounts are reported to number nearly 3.9 billion in 2013, and are expected to grow another billion by the end of 2017. (from April 2013 The Radicati Group, Inc. "Email Statistics Report, 2013-2017"). Not only are the number of email accounts growing, but the volume of email messages that are transmitted is also growing, as more and more personal users and businesses rely on email for their communications.

Very often email subscribers wish to send the same email message to multiple recipients. This is facilitated by creating an electronic mailing list or email list which allows distribution of one email to multiple parties on the email list when the subscriber enters the email list name (also called a reflector address). Email lists are quite popular because they allow the email clients to efficiently propagate an email across multiple recipients. Referring now to FIG. 1, we illustrate another common scenario in propagating email messages, the "Reply All" to an existing message 100 (an email thread). The problem with "Reply All" is that it distributes the entire email thread 120, including all past emails on the thread, content, signatures, disclaimers, and attachments. This makes for a cumbersome message, forcing email clients to solve this problem by deleting the thread contents, thus adding a step to a process meant to simplify.

There is a need for a system and method to overcome the shortcomings of the known art.

SUMMARY OF THE INVENTION

Briefly, according to embodiments of the present disclosure a method and system for facilitating emails combines the convenience of an auto-fill of the recipient fields in a standard email message with a blank canvas for composing a new message. By selecting the Quick Reply feature that can be provided with the message view screen of an email utility, the user is shown a second user interface with a blank compose screen. The email recipients are automatically filled in from the message view screen of the current message. The Quick Reply message can be transmitted as an email message through the email utility.

The steps, or acts, for generating and transmitting a Quick Reply message include: receiving a selection of the Quick Reply feature from a first user interface associated with a message view screen of an email utility; rendering a second user interface that includes a Quick Reply compose screen with a blank subject and body; populating the recipient field of the Quick Reply compose screen with the email clients from the message view screen; and transmitting the Quick Reply compose screen as an email message to the email clients in the recipient field using the email utility.

BRIEF DESCRIPTION OF THE SEVERAL VIEWS OF THE DRAWINGS

To describe the foregoing and other exemplary purposes, aspects, and advantages, we use the following detailed description of an exemplary embodiment of the disclosure with reference to the drawings, in which:

FIG. 4 is a simplified illustration of a message view with a Quick Reply icon, according to an embodiment of the present disclosure;

FIG. 5 is a simplified illustration of the compose screen user interface for a Quick Reply message, according to an embodiment of the present disclosure.

Figure 1:
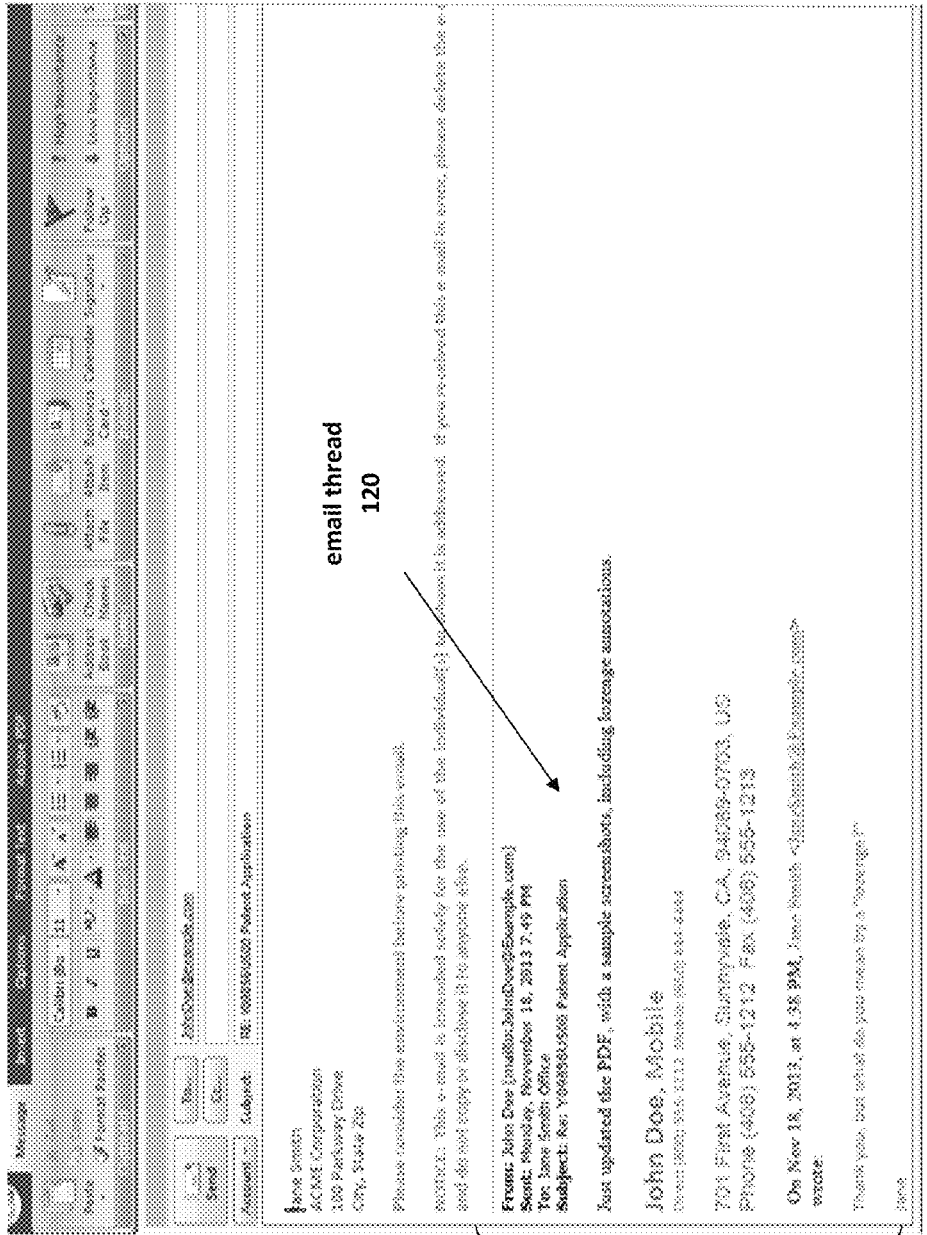
FIG. 1 is an exemplary illustration of a email message using "Reply All" according to the known art.

While the disclosure as claimed can be modified into alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the scope of the present disclosure.

DETAILED DESCRIPTION

Before describing in detail embodiments that are in accordance with the present disclosure, it should be observed that the embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

We describe a solution to overcome the shortcomings of the known art as stated above, by providing a more convenient way to compose and send an email message using the list of participants on an existing thread, without necessitating a "Reply All" and its cumbersome thread content. This solution addresses the issue of having to create and maintain a group mailing list, as well as addressing the issue of having to perform "housekeeping" on an email thread with a "Reply All." We provide, in essence, a "blank canvas" for an email message, while also providing the "one-click" auto-fill convenience associated with a "Reply All" participant list.

Benefits and Advantages.

The Quick Reply messaging according to the disclosure eases the spin-off of an existing mail message/thread by generating a new message with the existing participants on a blank canvas, essentially providing seamless message creation with existing participants. This solution enhances productivity because simply tapping a button saves the user several steps: initiating a new message, finding the list of participants, while increasing accuracy and user engagement.

Process View.

Figure 2:
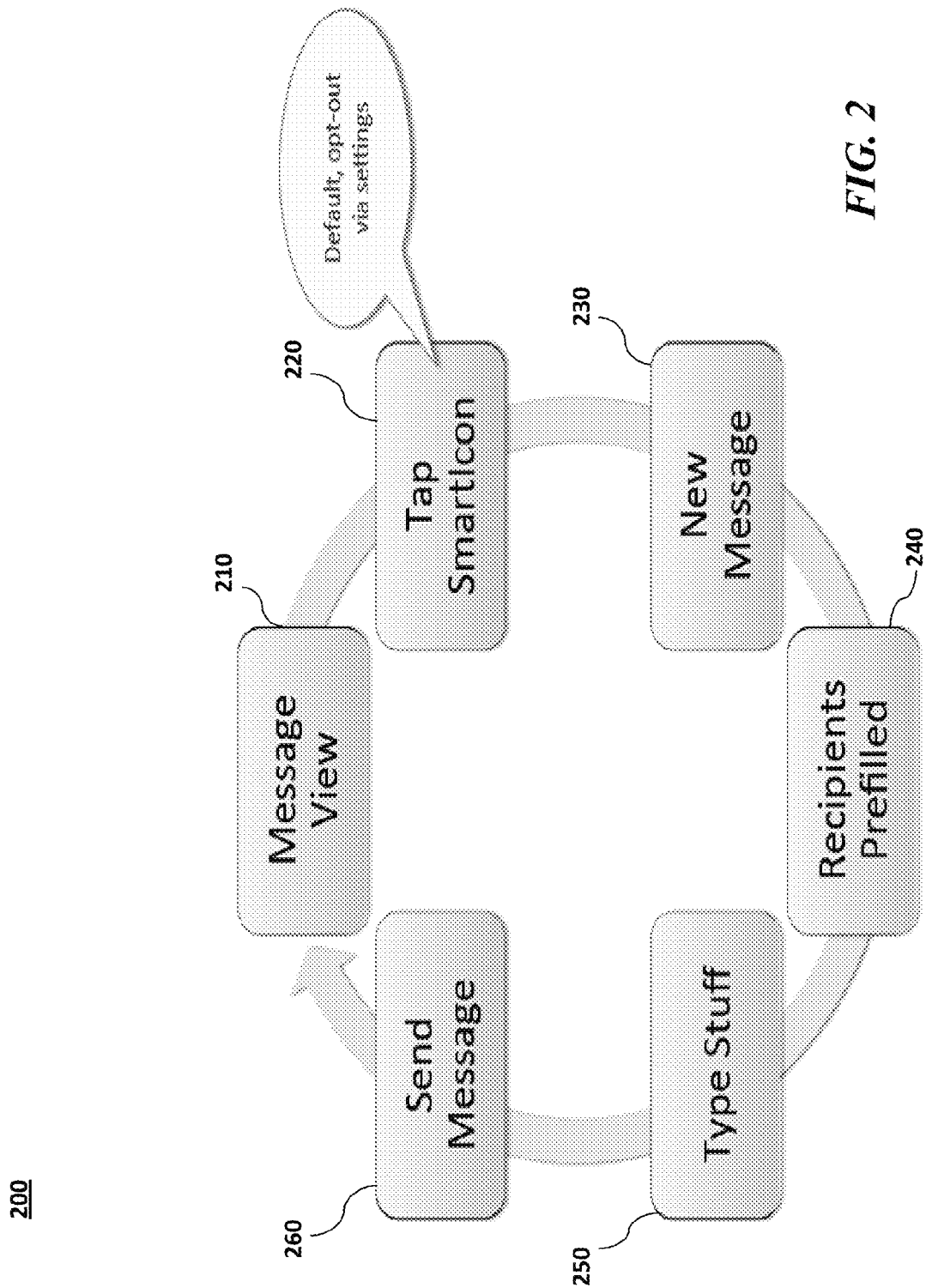
FIG. 2 is a simplified illustration of the process flow for a quick reply email message, according to an embodiment of the present disclosure.

Referring to FIG. 2, there is shown a simplified depiction of the process flow for email message quick reply, according to an embodiment of the present disclosure. An input to the process is the quick reply user interface (UI) which will be discussed later. The process begins when the email client receives an email message and is viewing the message in the message view screen in step 210. The message view screen is supplied by the email software (Outlook®, Yahoo! Mail, Google Mail, and others). From the message view screen, the email client opts to use Quick Reply in step 220. The client can select Quick Reply by either tapping an icon on the view screen, depressing a hotkey, or any other selection method technology known or contemplated.

Once the Quick Reply option is selected, in step 230 a Quick Reply message screen is presented. This Quick Reply screen, in contrast to a "Reply All" screen, does not carry over any content. The content and subject areas are left blank; the subject, content, signature, Facebook® and Twitter® icons, and the disclaimer, are all eliminated. The recipients from the current email are automatically populated in the "To" area in step 240. The recipients are the same email clients who would normally be included if the client had activated the "Reply All." In addition, the email client is able to add additional recipients, if desired. In step 250 the email client adds a subject and/or content to the email message, if desired, and then in step 260 sends the quick reply message.

Quick Reply System Overview.

Figure 3:
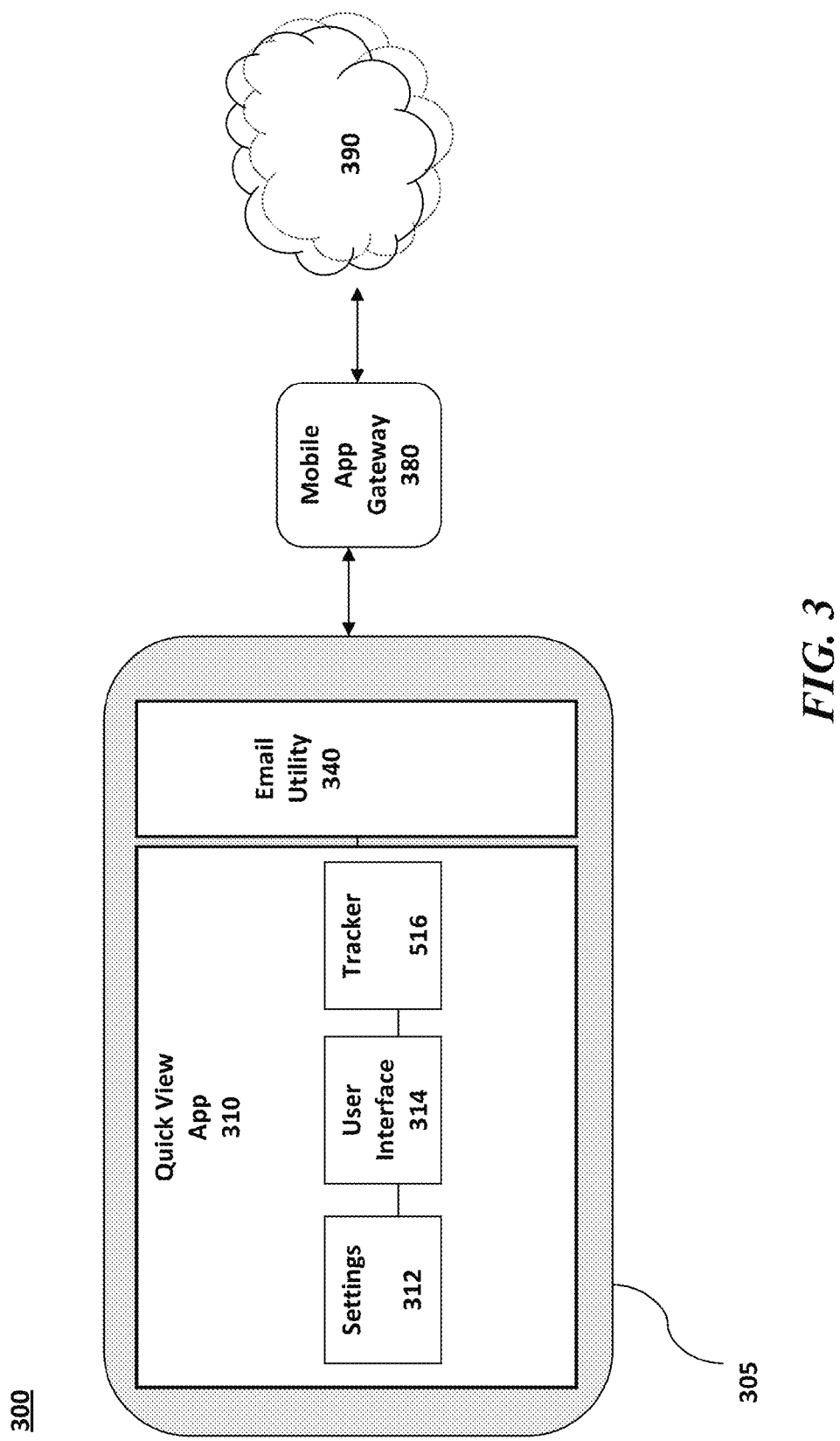
FIG. 3 is a simplified block diagram of a system in which the Quick Reply messaging system can be implemented, according to an embodiment of the present invention.

Referring to FIG. 3, there is shown a high-level block diagram of a system 300 in which the Quick Reply method can be advantageously implemented, according to an embodiment of the present disclosure. A client device 305 is shown here with a pre-loaded email utility 340 such as Yahoo! Mail, Google Mail, Microsoft Outlook, or any email utility known or contemplated. The Quick Reply method must interact with an email utility 340 therefore the client device 305 must have either a pre-loaded email utility 340 or, access to one through a network such as the Internet 390. The quick reply messaging app 310 is operatively coupled with the email utility 340 and may be bundled together with the email utility 340 or offered as a separate app. The quick reply messaging app 310 can be software that is downloaded onto the client device 505 or it can be accessed by the client device 305. One with knowledge in the art will appreciate that other components required for operation of the client device 305 (such as a processor, memory, and the like) have been omitted to simplify the illustration.

The client device 305 shown here is able to access the Internet 390 through a Mobile App Gateway 380. The Quick View feature 310, once installed on the user's device 305, will remain ON by default. The feature 310 can be enabled/disabled through a settings entry in the Settings 312 component of the Quick View App 310. The user interface 314 is a configurable component of the Quick View App 310.

A Tracker 316 component of the Quick View App 310 is used for tracking user habits vis-à-vis the Quick Reply feature 310. For example, the Tracker 316 can record how many times the user triggers the Quick Reply message interface.

Those skilled in the art will appreciate that the functionality implemented within the blocks illustrated in the diagram of FIG. 3 may be implemented as separate components (logical or hardware) or the functionality of several or all of the blocks may be implemented within a single component. For example, the functionality for the Tracker 316 may be included in the same component as the Settings 312. Or the functionality of the Interface 314 may be implemented as a separate component from the Settings 312.

Quick Reply User Interface.

Referring now to FIG. 4 there is shown an exemplary message view or "compose" screen 400 common to email utilities. This is the user interface that is provided with email utilities such as Yahoo! Mail, Microsoft Outlook, Google Mail, and The message view screen 400 shows a) the sender of the email 410, b) the recipient 420, and c) the email message or content 430. Additionally the message view screen 400 can also provide the subject of the email (not shown here). Note that the email message content 430 can include an entire email thread. Also shown in FIG. 4 is the Quick Reply GUI (graphical user interface) in the form of an icon 450. The Quick Reply icon 450 appears on the bottom tool bar in this example; however, those with knowledge in the art will appreciate that the icon 450 can be rendered in a different location on the screen 400. Additionally, the icon 450 can be replaced by a hotkey or button, or any other user interface known or contemplated that allows the user to select a Quick Reply message by a single tap.

Referring now to FIG. 5 there is shown an exemplary Quick Reply message interface 500 that is presented upon activation of the Quick Response app 310. In one embodiment, as shown in FIG. 5, the interface 500 is activated by tapping the icon 450. The Quick Reply interface 500 presents the recipient field(s) already filled in from the original message. The recipients for the Quick Reply message 500 will default to those email clients listed in the currently viewed message 400. In other words, the email clients from the "To" and "From" fields and any "cc" fields will be selected as the default recipients in the Quick View message interface 500. Each recipient entry is made into a lozenge or bubble when selected. The email client is able to add additional recipients with the aid of an "Add" icon 460. The content of the currently viewed message is intentionally left blank to allow the email client to compose and send a new message to the recipients in an existing message.

Monetization.

The Quick Reply feature 310 can be provided as a downloadable application (app) for a one-time fee or it can be provided as a subscription service.

Figure 6:
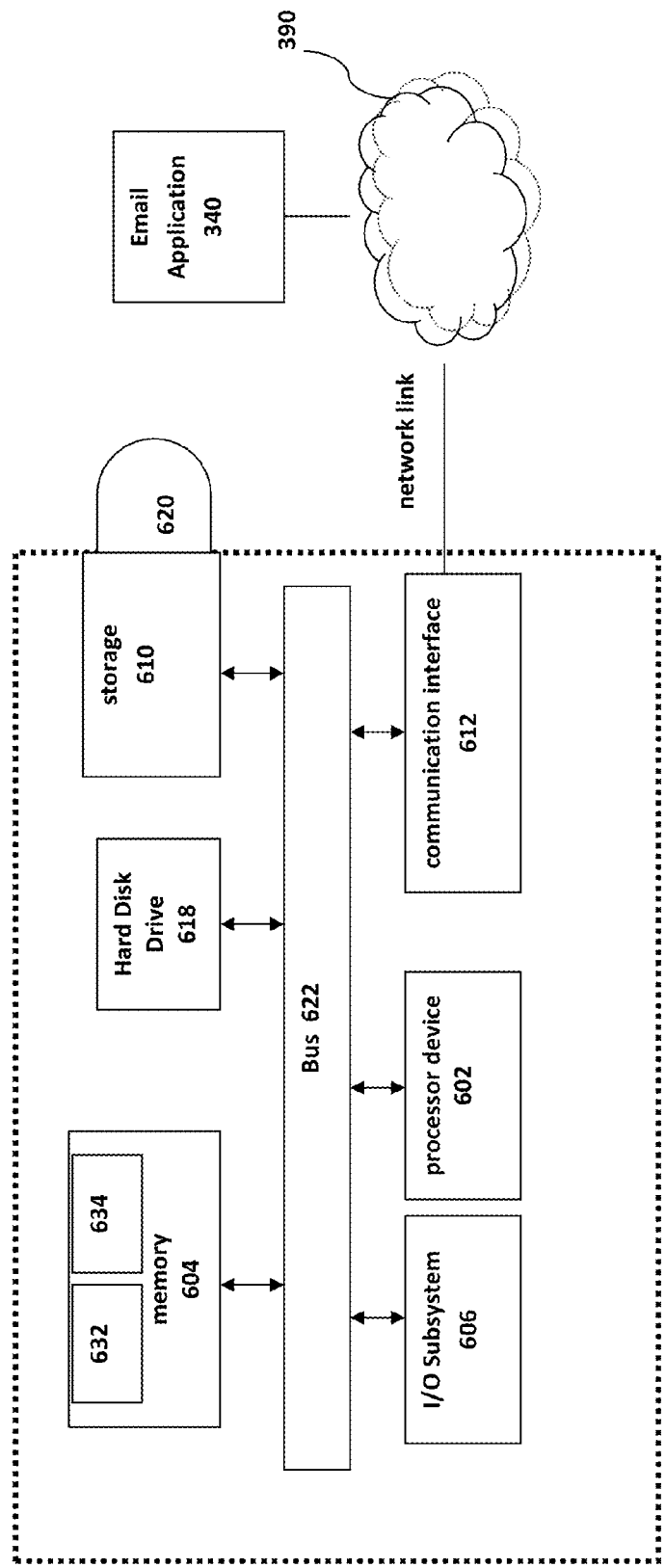
FIG. 6 is a high-level block diagram of the hardware components required for implementing the Quick Reply feature, according to an embodiment of the present disclosure.

FIG. 6 Hardware Embodiment.

Referring now in specific detail to the drawings, and particularly to FIG. 6, there is provided a simplified pictorial illustration of a device 305 configured for generating and processing Quick Reply email messages, in which the present disclosure may be implemented. For purposes of this invention, computer system 305 may represent any type of computer, information processing system or other programmable electronic device, including a client computer, a server computer, a portable computer, a tablet device, an embedded controller, a personal digital assistant, a Cloud computing device, TV Internet, and so on.

The computer system 305 may be a stand-alone device or networked into a larger system. Computer system 305, illustrated for exemplary purposes as a networked computing device, is in communication with other networked computing devices (not shown) via network 610. As will be appreciated by those of ordinary skill in the art, network 610 may be embodied using conventional networking technologies and may include one or more of the following: local area networks, wide area networks, intranets, public Internet 390 and the like.

Throughout the description herein, an embodiment of the disclosure is illustrated with aspects of the invention embodied solely on computer system 305. As will be appreciated by those of ordinary skill in the art, aspects of the disclosure may be distributed amongst one or more networked computing devices which interact with computer system 305 via one or more data networks such as, for example, network 610. However, for ease of understanding, aspects of the invention have been embodied in a single computing device—computer system 305.

Computer system 305 includes processing device 602 which communicates with an input/output subsystem 606, memory 604, storage 610 and network 610. The processor device 602 is operably coupled with a communication infrastructure 622 (e.g., a communications bus, cross-over bar, or network). The processor device 602 may be a general or special purpose microprocessor operating under control of computer program instructions 632 executed from memory 604 on program data 634. The processor device 602 may include a number of special purpose sub-processors such as a comparator engine, each sub-processor for executing particular portions of the computer program instructions. Each sub-processor may be a separate circuit able to operate substantially in parallel with the other sub-processors.

Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips.

The memory 604 may be partitioned or otherwise mapped to reflect the boundaries of the various memory subcomponents. Memory 604 may include both volatile and persistent memory for the storage of: operational instructions 632 for execution by the processor 602, data registers, application storage and the like. Memory 604 preferably includes a combination of random access memory (RAM), read only memory (ROM) and persistent memory such as that provided by a hard disk drive 618. The computer instructions/applications that are stored in memory 604 are executed by processor 602. The computer instructions/applications 632 and program data 634 can also be stored in hard disk drive 618 for execution by processor device 602.

The I/O subsystem 606 may comprise various end user interfaces such as a touch screen display, a keyboard, and a mouse. The I/O subsystem 606 may further include a connection to a network such as a local-area network (LAN) or wide-area network (WAN) such as the Internet 390. Computer system 305 can access the Email Application 340 through the Internet 390.

The computer system 305 may also include a removable storage drive 610, representing a floppy disk drive, a magnetic tape drive, an optical disk drive, etc. The removable storage drive 610 reads from and/or writes to a removable storage unit 620 in a manner well known to those having ordinary skill in the art. Removable storage unit 620, represents a floppy disk, a compact disc, magnetic tape, optical disk, CD-ROM, DVD-ROM, etc. which is read by and written to by removable storage drive 610. As will be appreciated, the removable storage unit 620 includes a non-transitory computer readable medium having stored therein computer software and/or data.

The computer system 305 may also include a communications interface 612. Communications interface 612 allows software and data to be transferred between the computer system and external devices. Examples of communications interface 612 may include a modem, a network interface (such as an Ethernet card), a communications port, a PCM-CIA slot and card, etc. Software and data transferred via communications interface 612 are in the form of signals which may be, for example, electronic, electromagnetic, optical, or other signals capable of being received by communications interface 612.

In this document, the terms "computer program medium," "computer usable medium," and "computer readable medium" are used to generally refer to non-transitory media such as main memory 604, removable storage drive 620, a hard disk installed in hard disk drive 618. These computer program products are means for providing software to the computer system 305. The computer readable medium 620 allows the computer system 305 to read data, instructions, messages or message packets, and other computer readable information from the computer readable medium 1120.

Therefore, while there has been described what is presently considered to be the preferred embodiment, it will understood by those skilled in the art that other modifications can be made within the spirit of the disclosure. The above description(s) of embodiment(s) is not intended to be exhaustive or limiting in scope. The embodiment(s), as described, were chosen in order to explain the principles of the disclosure, show its practical application, and enable those with ordinary skill in the art to understand how to make and use the disclosure. It should be understood that the disclosure is not limited to the embodiment(s) described above, but rather should be interpreted within the full meaning and scope of the appended claims.

We claim:

1. A method for facilitating email messaging, comprising: using a processor device, performing acts of:
    receiving a selection of a quick reply feature from a first user interface associated with a message view screen of an email utility, the message view screen displaying a body of a first email message;
    responsive to receiving the selection, rendering a second user interface comprising a quick reply compose screen with a blank subject and body;
    populating a recipient field of the quick reply compose screen with one or more email clients from the message view screen, wherein populating the recipient field comprises:
        adding one or more first email clients from a sender field of the message view screen; and
        adding one or more second email clients from a recipient field of the message view screen;
    transmitting the quick reply compose screen as a second email message to the one or more email clients in the recipient field using the email utility; and
    tracking a number of times that a user selects the quick reply feature.

2. The method of claim 1, comprising rendering a quick reply icon on the first user interface for selecting the quick reply feature on the message view screen.

3. The method of claim 1, wherein populating the recipient field comprises:

adding one or more third email clients from a copy field of the message view screen.

4. The method of claim 3, comprising adding at least one additional email client to the recipient field.

5. The method of claim 4, wherein adding the at least one additional email client is performed responsive to receiving a selection of an add icon in the quick reply compose screen.

6. The method of claim 3, comprising:
receiving input from the user in the body of the quick reply compose screen; and
receiving a command from the user to send the input to the email clients in the recipient field.

7. The method of claim 2, wherein receiving the selection of the quick reply feature comprises receiving a signal generated from the user tapping the quick reply icon.

8. The method of claim 1, comprising charging a fee for use of the quick reply feature.

9. An information processing system for facilitating email messaging, the information processing system comprising:
access to an email utility;
a first user interface provided by the email utility;
a memory comprising computer-executable instructions; and
a processor device operably coupled with the memory and the first user interface and performing the computer-executable instructions comprising:
receiving a selection of a quick reply feature from the first user interface associated with a message view screen, the message view screen displaying a body of a first email message;
responsive to receiving the selection, rendering a second user interface comprising a quick reply compose screen with a blank subject and body;
populating a recipient field of the quick reply compose screen with one or more email clients from the message view screen, wherein populating the recipient field comprises:
adding one or more first email clients from a sender field of the message view screen; and
adding one or more second email clients from a recipient field of the message view screen;
transmitting the quick reply compose screen as a second email message to the one or more email clients in the recipient field using the email utility; and
tracking a number of times that a user selects the quick reply feature.

10. The information processing system of claim 9, comprising a quick reply icon rendered on the first user interface, the quick reply icon, when selected by the user, activating the quick reply feature on the message view screen.

11. The information processing system of claim 10, wherein activating the quick reply feature is performed by the user tapping the quick reply icon.

12. The information processing system of claim 9, wherein populating the recipient field comprises:
adding one or more third email clients from a copy field of the message view screen.

13. The information processing system of claim 12, wherein populating the recipient field comprises adding at least one additional email client to the recipient field.

14. The information processing system of claim 13, wherein adding the at least one additional email client is performed responsive to receiving a selection of an add icon in the quick reply compose screen.

15. The information processing system of claim 12, wherein the computer-executable instructions comprise:
receiving input from the user in the body of the quick reply compose screen; and
receiving a command from the user to send the input to the email clients in the recipient field.

16. A computer program product comprising a non-transitory computer-readable storage medium with computer-executable instructions stored thereon, the computer-executable instructions causing a computer to perform:
receiving a selection of a quick reply feature from a first user interface associated with a message view screen, the message view screen displaying a body of a first email message, the first user interface provided by an email utility;
responsive to receiving the selection, rendering a second user interface comprising a quick reply compose screen with a blank subject and body;
populating a recipient field of the quick reply compose screen with one or more email clients from the message view screen, wherein populating the recipient field comprises:
adding one or more first email clients from a sender field of the message view screen; and
adding one or more second email clients from a recipient field of the message view screen;
transmitting the quick reply compose screen as a second email message to the one or more email clients in the recipient field using the email utility; and
tracking a number of times that a user selects the quick reply feature.

17. The computer program product of claim 16, wherein the computer-executable instructions cause the computer to perform rendering a quick reply icon on the first user interface for selecting the quick reply feature on the message view screen.

18. The computer program product of claim 16, wherein populating the recipient field comprises:
adding one or more third email clients from a copy field of the message view screen.

19. The computer program product of claim 18, wherein the computer-executable instructions cause the computer to perform:
receiving input from the user in the body of the quick reply compose screen; and
receiving a command from the user to send the input to the email clients in the recipient field.

20. The computer program product of claim 16, wherein the computer-executable instructions cause the computer to perform adding at least one additional email client to the recipient field responsive to receiving a selection of an add icon in the quick reply compose screen.

21. The computer program product of claim 16, wherein the computer-executable instructions cause the computer to perform charging a fee for use of the quick reply feature.

* * * * *